United States Patent
Scholz et al.

(10) Patent No.: US 12,115,888 B2
(45) Date of Patent: Oct. 15, 2024

(54) FITTING FOR VEHICLE SEAT

(71) Applicant: ADIENT US LLC, Plymouth, MI (US)

(72) Inventors: Grit Scholz, Remscheid (DE); Kirubaharan Albert Reginold, Burscheid (DE); Dieter Henkel, Remscheid (DE); Daniel Huebner, Leverkusen (DE); Balaji Paramasivam, Leverkusen (DE); Arkadius Rock, Solingen (DE); Rolf Schueler, Heiligenhaus (DE); Mothanna Yasen, Wermelskirchen (DE)

(73) Assignee: Keiper Seating Mechanisms Co., Ltd, Shanghai (CN)

( * ) Notice: Subject to any disclaimer, the term of this patent is extended or adjusted under 35 U.S.C. 154(b) by 148 days.

(21) Appl. No.: 17/610,206

(22) PCT Filed: May 8, 2020

(86) PCT No.: PCT/EP2020/062898
§ 371 (c)(1),
(2) Date: Nov. 10, 2021

(87) PCT Pub. No.: WO2020/229354
PCT Pub. Date: Nov. 19, 2020

(65) Prior Publication Data
US 2022/0219577 A1    Jul. 14, 2022

(30) Foreign Application Priority Data

May 10, 2019   (DE) .................... 10 2019 112 345.3
Oct. 31, 2019   (DE) .................... 10 2019 129 528.9

(51) Int. Cl.
*B60N 2/225* (2006.01)
*B60N 2/22* (2006.01)

(52) U.S. Cl.
CPC ......... *B60N 2/2252* (2013.01); *B60N 2/2213* (2013.01); *B60N 2205/20* (2013.01)

(58) Field of Classification Search
None
See application file for complete search history.

(56) References Cited

U.S. PATENT DOCUMENTS 4,713,986 A * 12/1987 Cremer ................ B60N 2/2252
475/180
4,781,416 A * 11/1988 Johnson ............... B60N 2/2252
475/176

(Continued)

FOREIGN PATENT DOCUMENTS

DE   30 13 304 A1   10/1981
DE   3 129 672 C1   10/1982

(Continued)

OTHER PUBLICATIONS

PCT International Search Report and Written Opinion (PCT/EP2020/062898).

*Primary Examiner* — David E Allred
(74) *Attorney, Agent, or Firm* — Marshall & Melhorn, LLC (57) ABSTRACT

A joint fitting for a motor vehicle seat may have a first fitting part with a first sprocket and a second fitting part with a second sprocket. The fitting may also have a gear which rolls in the first sprocket and in the second sprocket to generate a rotational movement between the two sprockets. The fitting may also have an eccentric which is arranged between the first fitting part and the gear for driving a rolling movement of the gear in the first sprocket. The eccentric may have two wedge segments and a spring which pushes the wedge segments apart. An additional eccentric is arranged between the second fitting part and the gear for removing a play between the gear and the second sprocket.

(Continued)

The additional eccentric may have two wedge segments. A vehicle seat having at least one such gearing fitting is also provided.

20 Claims, 4 Drawing Sheets

(56) References Cited

U.S. PATENT DOCUMENTS

| | | | | |
|---|---|---|---|---|
| 4,887,017 | A * | 12/1989 | Ito | B60N 2/2252 318/626 |
| 5,542,772 | A * | 8/1996 | Reuber | B60N 2/2254 403/325 |
| 6,076,889 | A * | 6/2000 | Su | B60N 2/2252 475/341 |
| 9,114,737 | B2 * | 8/2015 | Stilleke | B60N 2/2252 |
| 9,227,542 | B2 * | 1/2016 | Mayer | B60N 2/682 |
| 2006/0084547 | A1 * | 4/2006 | Dill | B60N 2/2252 475/162 |
| 2007/0290540 | A1 * | 12/2007 | Voss | B60N 2/2252 297/362 |
| 2010/0171352 | A1 * | 7/2010 | Kienke | B60N 2/2252 297/362 |
| 2013/0106161 | A1 * | 5/2013 | Ohba | B60N 2/682 297/362 |
| 2013/0134759 | A1 * | 5/2013 | Oki | B60N 2/1685 297/362 |
| 2013/0214579 | A1 * | 8/2013 | Jokiel | B60N 2/2252 297/362 |
| 2022/0015542 | A1 * | 1/2022 | Chang | A47C 1/024 |
| 2022/0133042 | A1 * | 5/2022 | Oishi | B60N 2/2356 297/362 |

FOREIGN PATENT DOCUMENTS

| | | | | |
|---|---|---|---|---|
| DE | 44 36 101 B4 | | 6/1996 | |
| DE | 19716807 A1 | * | 10/1998 | ........... B60N 2/2252 |
| DE | 10 2004 050 152 A1 | | 4/2006 | |
| DE | 10 2005 031 263 A1 | | 7/2006 | |
| DE | 10 2010 012 980 A1 | | 5/2011 | |
| DE | 10 2010 013 092 A1 | | 5/2011 | |
| EP | 1647438 A2 | * | 4/2006 | ........... B60N 2/2252 |
| EP | 2735471 A1 | * | 5/2014 | ........... B60N 2/2251 |
| JP | 2003237433 A | * | 8/2003 | ............. B60N 2/181 |

* cited by examiner

FITTING FOR VEHICLE SEAT

The invention relates to a joint fitting for a vehicle seat, in particular for a motor vehicle seat, having a first fitting part with a first sprocket, a second fitting part with a second sprocket, the second fitting part being rotatable about an axis of rotation relative to the first sprocket, a gear, which rolls in the first sprocket and in the second sprocket, for generating a rotary movement between the first sprocket and the second sprocket, an eccentric, which is arranged between the first fitting part and the gear, for driving a rolling movement of the gear in the first sprocket, the eccentric having two wedge segments and a spring that pushes the wedge segments apart. The invention also relates to a vehicle seat.

FIELD

DE 30 13 304 A1 discloses an adjusting device for seats and windows in particular of motor vehicles, having articulated levers that are connected together via a pivot pin, wherein an internal gear is assigned to one articulated lever and a spur gear that meshes in the other articulated lever is assigned to said other articulated lever, the tip circle of said spur gear being at least one tooth height smaller than the root circle of the internal gear, and one of the two articulated levers is mounted on an eccentric connected to the drivable pivot pin in a torque-transmitting manner. The eccentric consists of a driver disk arranged on the pivot pin for conjoint rotation and of two wedge segments which are inclined relative to one another, regionally enclose the driver disk at its periphery, and between which an energy store that pushes the wedge segments apart is arranged.

DE 44 36 101 A1 discloses a joint fitting for seats having an adjustable backrest, in particular motor vehicle seats in which a fixed joint part assigned to the sitting part and a pivotable joint part assigned to the backrest are connected together via a pivot pin, wherein an adjusting and fixing device that determines the position of the two joint parts relative to one another and is in the form of a transmission is provided and the pivot pin, for mounting one joint part, has an eccentric portion that is formed from two wedge segments that regionally enclose the pivot pin and are inclined relative to one another, a driver arm that engages between the narrow sides of said wedge segments, and an energy store that pushes the wide sides of the wedge segments apart, wherein the pivot pin of each joint fitting has a central receptacle for connecting, for conjoint rotation, to a transmission rod that couples the two joint fittings of a seat together. The driver is in the form of a bush that is connected integrally to the driver arm integrated into the driver and is connected to a covering disk that engages externally over the joint region. The bush has, in its center, the torque-transmitting receptacle for a transmission rod.

DE 10 2005 031 263 A1 discloses a joint fitting for an adjustable vehicle seat, in particular a joint fitting for a backrest of a motor vehicle seat, having a first sprocket, having a second sprocket, wherein the two sprockets are rotatable about an axis with respect to one another and are centered about this axis, and having a drive unit having a shaft for introducing an adjusting movement, wherein the shaft is central with respect to the axis, a central, circular recess which is offset with respect to the axis by a degree of eccentricity, a drive part which is located in the recess, bears against this recess and is rotationally connected to the shaft, and a compensating unit which has a wedge piece connected to the shaft, a mating face that cooperates with this wedge piece and is formed on the drive part, and an elastic means that preloads the drive part such that the drive part is pushed toward the highest point of the wedge piece.

The development of autonomously driving vehicles requires an extended setting range of the vehicle seat used by an occupant in charge of the vehicle, in order for it to be possible to increase the comfort for a driver who is no longer constantly steering. This means, while at the same time maintaining occupant safety in the event of an accident, that a seatbelt has to move entirely with the seat in order to bear closely on the occupant even in the case of a vehicle seat arranged far back or of a backrest that has been set into a flat position. Such belt systems, the shoulder belt of which is therefore no longer fastened to the B pillar so as to be fixed to the vehicle body but rather in the upper region of the backrest, result in significantly greater loads in the setting fitting and consequently, while having the same basic mechanical principle, require more installation space and more weight than in the case of setting fittings known from the prior art.

BACKGROUND

The invention is based on the problem of improving a joint fitting of the type mentioned at the beginning, in particular of reducing backlash in the joint fitting, and of providing a corresponding vehicle seat.

SUMMARY

This problem is solved by a joint fitting for a vehicle seat, in particular for a motor vehicle seat, having a first fitting part with a first sprocket, a second fitting part with a second sprocket, the second fitting part being rotatable about an axis of rotation relative to the first sprocket, a gear, which rolls in the first sprocket and in the second sprocket, for generating a rotary movement between the first sprocket and the second sprocket, an eccentric, which is arranged between the first fitting part and the gear, for driving a rolling movement of the gear in the first sprocket, the eccentric having two wedge segments and a spring that pushes the wedge segments apart, wherein a further eccentric, in particular for eliminating backlash between the gear and the second sprocket, is arranged between the second fitting part and the gear, the further eccentric having two wedge segments.

Since a further eccentric, in particular for eliminating backlash between the gear and the second sprocket, is arranged between the second fitting part and the gear, wherein the further eccentric has two wedge segments, a joint fitting with reduced backlash is provided.

The two sprockets can have different numbers of teeth from one another. By choosing the difference in the numbers of teeth, the step-down ratio between the two fitting parts, or between the gear, for the one part, and the fitting parts, for the other part, can be set structurally. The difference in the numbers of teeth between the two sprockets can be exactly one. Preferably, the first sprocket has 50 teeth and the second sprocket has 51 teeth. The difference in the numbers of teeth between the two sprockets can be greater than one.

The gear preferably has a lower number of teeth than either of the two sprockets. The difference between the number of teeth of the gear and the number of teeth of one of the two sprockets can be exactly one. Preferably, the gear has 49 teeth. The difference in the numbers of teeth between the gear and the two sprockets can also be greater than one in each case, however.

The gear can be equipped with a common toothing for both sprockets, said toothing being the same for both sprockets. Alternatively, the gear can be constructed from two different gears that are fixedly connected together and have a different number of teeth, wherein one gear is in mesh with the first sprocket and the other gear is in mesh with the second sprocket.

Preferably, the two eccentrics have an identically oriented eccentricity with respect to the axis of rotation. This means that the two eccentrics are not arranged in a skewed manner with respect to one another. In each case two wedge segments can be arranged axially adjacent to one another. The two eccentrics can be arranged axially adjacent to one another. The wedge segments of the two eccentrics can be identical parts.

In each case two wedge segments can be arranged mirror-symmetrically to a plane of symmetry extending perpendicularly to the axis of rotation. The two eccentrics can be arranged mirror-symmetrically to a plane of symmetry extending perpendicularly to the axis of rotation.

The eccentric can have a spring that pushes its wedge segments apart. Since the spring pushes the wedge segments apart, the gear is in backlash-free mesh with the first sprocket in a radial direction. The further eccentric can also have a spring that pushes its wedge segments apart. Since the spring pushes the wedge segments apart, the gear is also in backlash-free mesh with the second sprocket in a radial direction.

The further eccentric can have a driver that drives its wedge segments. A driver arm of the driver can engage between the wedge segments of the eccentric such that, as a result of rotation of the driver, the wedge segments are rotated and as a result drive the gear.

The two fitting parts can be fixed axially with respect to one another by a clasp ring. The two fitting parts are then movable to a limited extent in a radial direction with respect to one another, however, in order that radial backlash can be compensated by the eccentric.

At least one of the eccentrics can be mounted in a plain bearing bush in order to reduce friction. The plain bearing bush can be arranged in, in particular pressed into, one of the two fitting parts. Preferably, each of the two eccentrics is mounted in a respective plain bearing bush. As a result of the wedge segments being mounted in plain bearings, the load-bearing capacity is improved and the wear in fast mode is reduced.

As a result of a disk that is elastically preloaded in a radial direction, additional elimination of backlash between the gear and one of the two sprockets can take place. The disk can exhibit a more resilient material radially on the inside than radially on the outside. A radially outer region of the disk can be produced from a metal, in particular from steel. A radially outer region of the disk can have a slightly greater tip circle radius than the gear. A radially inner region of the disk can be produced from plastic or rubber.

The disk can have a toothing radially on the outside. The number of teeth of the toothing on the disk can be equal to the number of teeth of the sprocket with which the disk is in mesh. The toothing on the disk can be in mesh with the first sprocket. Alternatively, the toothing on the disk can be in mesh with the second sprocket. A radially inner region of the disk can be supported on a step of the gear. The step can be circumferential.

The problem is also solved by a vehicle seat having at least one joint fitting according to the invention. Preferably, the vehicle seat has a sitting part and a backrest, which is articulated on the sitting part so as be settable about an axis of rotation by the at least one joint fitting. As a result of the use of the joint fitting according to the invention, backlash at an upper edge of the backrest is reduced.

BRIEF DESCRIPTION OF THE FIGURES

The invention is explained in more detail in the following text by way of advantageous exemplary embodiments illustrated in the figures. The invention is not limited to these exemplary embodiments, however. In the figures.

DETAILED DESCRIPTION

Figure 1:
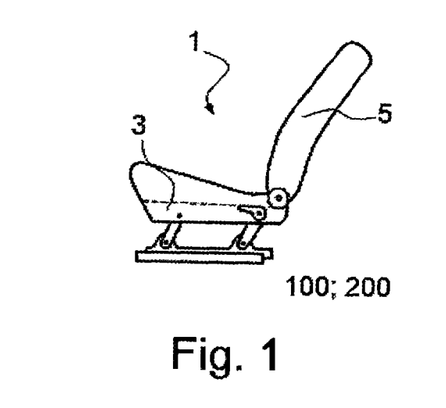
FIG. 1: shows a schematic view of a vehicle seat according to the invention having a joint fitting according to the invention.
Figure 2:
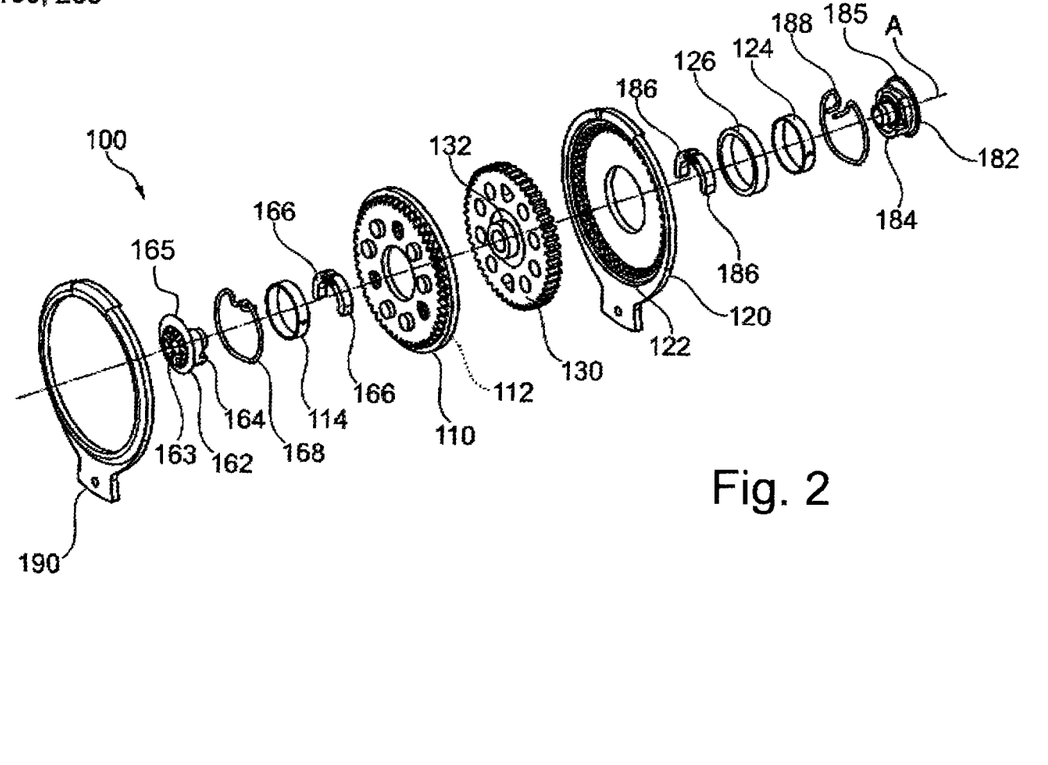
FIG. 2: shows an exploded illustration of a joint fitting according to the invention according to a first exemplary embodiment.
Figure 3:
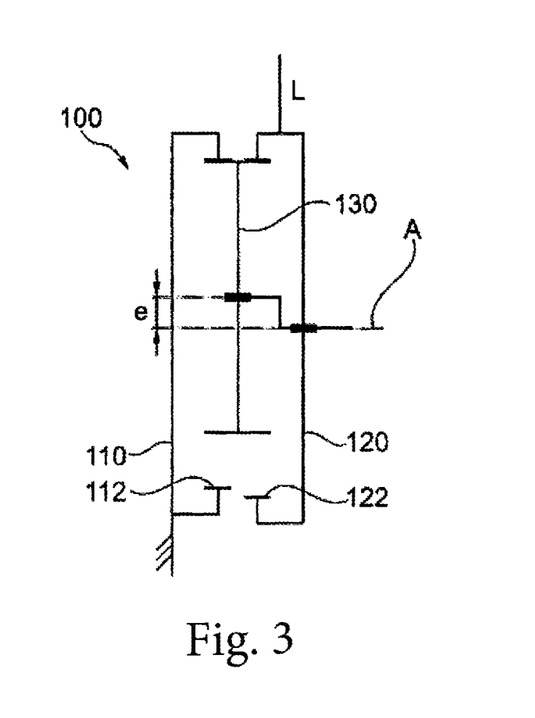
FIG. 3: shows an illustration of the transmission principle of the joint fitting from FIG. 2, FIG. 4: shows a perspective view of the joint fitting from FIG. 2, FIG. 5: shows a side view of the joint fitting from FIG. 2, wherein a driver is not illustrated in order to reveal wedge segments of an eccentric of the joint fitting.
Figure 4:
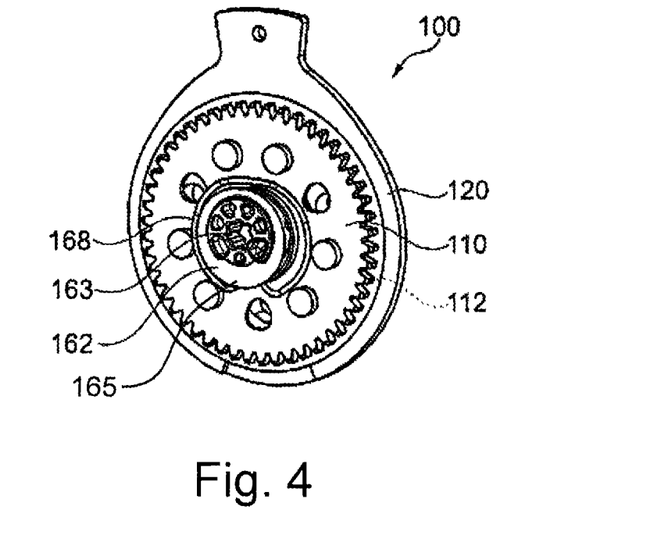
Figure 5:
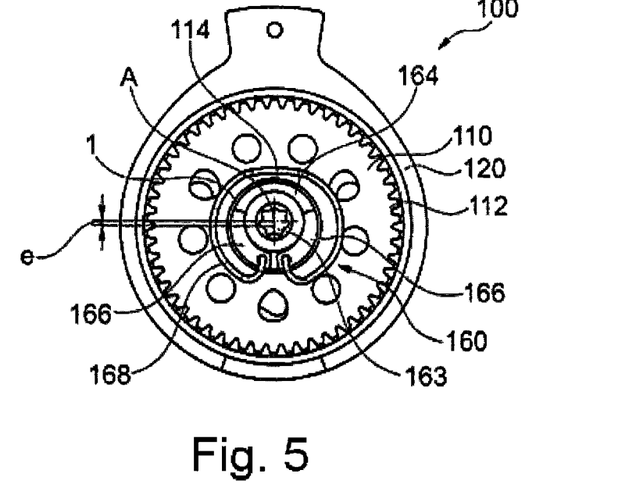
Figure 6:
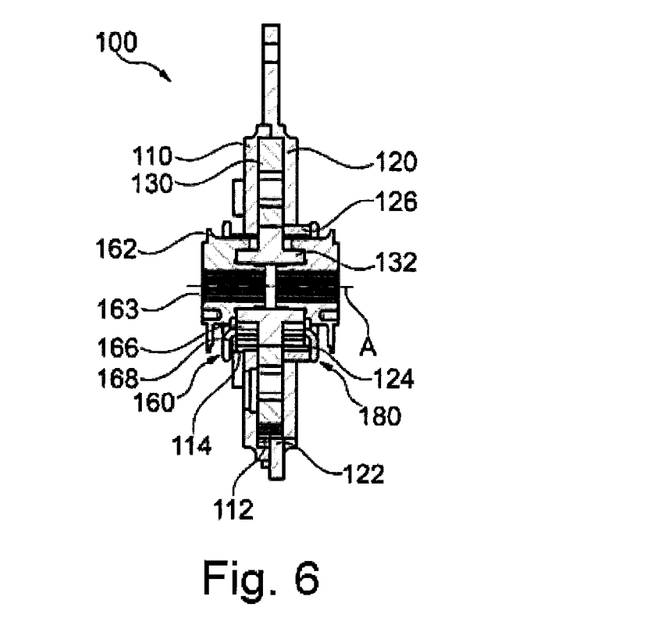
FIG. 6: shows a section through the joint fitting from FIG. 2, FIG. 7: shows a front view of the joint fitting from FIG. 2, and FIG. 8: shows a section through a joint fitting according to a second exemplary embodiment.
Figure 7:
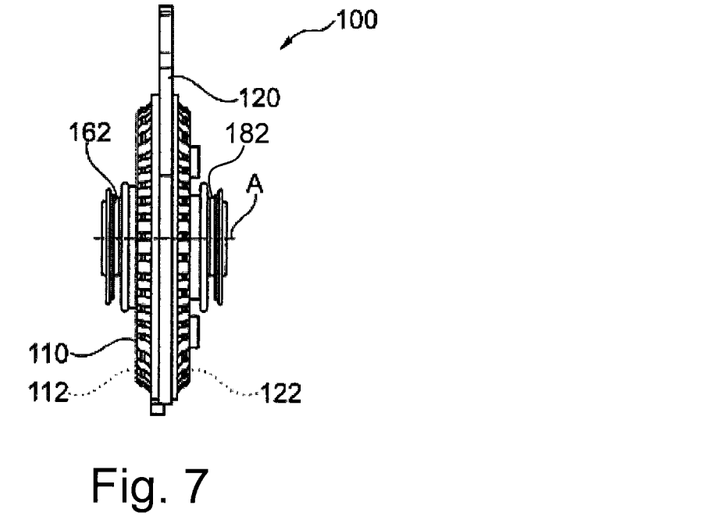

FIG. 1 shows a vehicle seat 1 according to the invention for a motor vehicle. The vehicle seat 1 has a sitting part 3 and a backrest 5 that is settable in terms of its inclination relative to the sitting part 3. To set the inclination of the backrest 5, a transmission rod is turned, for example manually by a hand wheel or in a motor-driven manner, for example by an electric motor. The transmission rod is arranged horizontally in the transition region between the sitting part 3 and the backrest 5. On both sides of the vehicle seat 1, the transmission rod engages for conjoint rotation in a respective joint fitting 100; 200 according to the invention.

FIGS. 2 to 7 show a first exemplary embodiment of a joint fitting 100 according to the invention. The joint fitting 100 has a first fitting part 110 and a second fitting part 120. The second fitting part 120 is rotatable about an axis of rotation A relative to the first fitting part 110. The direction specifications used in the following text, such as central, axial, radial and circumferential direction, relate to the axis of rotation A.

One of the two fitting parts 110; 120 is able to be connected for example fixedly to the sitting part 3 and the other of the two fitting parts 110; 120 is able to be connected fixedly to the backrest 5.

The first fitting part 110 has a first sprocket 112. The first fitting part 110 is preferably in the form of a ring gear. The axis of rotation A coincides with a central axis of the first sprocket 112. Fastened centrally to the first fitting part 110 is a plain bearing bush 114, which has preferably been pressed into a central opening in the first fitting part 110.

The second fitting part 120 has a second sprocket 122. The second fitting part 120 is preferably in the form of a ring gear. The axis of rotation A coincides with a central axis of the second sprocket 122. Fastened centrally to the second fitting part 120 is a bush 126, in which a plain bearing bush 124 is arranged. Preferably, the plain bearing bush 124 has been pressed into the bush 126 and thus into the second fitting part 120.

A gear 130 serves to drive the rotary movement of the second fitting part 120 about the axis of rotation A relative to the first fitting part 110. The gear 130 is in the form of an externally toothed gear. It is in mesh with the first internally toothed sprocket 112 and the second internally toothed sprocket 122. The gear 130 and the internal sprockets 112; 122 are configured such that the gear 130 can tumble within the internal sprockets 112; 122. Preferably, the two sprockets have a different number of teeth than one another, in particular a difference in the number of teeth of one. The gear 130 preferably has a lower number of teeth than either of the two sprockets 112; 122. The difference in the numbers of teeth between the gear 130 and one of the two sprockets 112; 122 can be exactly one. In the present exemplary embodiment, the first sprocket 112 has fifty teeth, the second sprocket 122 has fifty-one teeth and the gear 130 has forty-nine teeth.

The gear 130 has a shaft portion 132, which protrudes axially on both sides beyond the toothing. The shaft portion 132 is central with respect to the toothing of the gear 130 and tumbles about the axis of rotation A in the driven state.

To drive the tumbling rolling movement of the gear 130 in the internal sprockets 112; 122 and thus to drive the rotary movement of the second fitting part 120 about the axis of rotation A relative to the first fitting part 110, exactly one eccentric 160, also referred to below as first eccentric 160, is arranged between the shaft portion 132 and the plain bearing bush 114 of the first fitting part 110. In addition, exactly one further eccentric 180, also referred to below as second eccentric 180, is arranged between the shaft portion 132 and the plain bearing bush 124 of the second fitting part 120. The two eccentrics 160; 180 each have, in addition to the driving function, the function of compensating for radial backlash, as is described in more detail below. The two eccentrics 160; 180 each correspond, in terms of function and structure, to an eccentric known from DE 44 36 101 A1 and are constructed largely in a mirror-symmetric manner, for which reason only the first eccentric 160 is described in detail.

A first driver 162 is mounted in a rotatable manner in the shaft portion 132. The first driver 162 is preferably made integrally from plastic. The first driver 162 has a hub 163, which is mounted in a rotatable manner with its outer shell in an end region, facing in the direction of the first fitting part 110, of the shaft portion 132. Connected to the hub 163 is a driver arm 164 that engages regionally over the shaft portion 132 and is arranged at a radial distance from the hub 163. The driver arm 164 and the hub 163 transition into a covering disk 165, engaging radially over the first eccentric 160, of the driver 162.

Two wedge segments 166 are supported on the shaft portion 132 with their radially inwardly facing inner faces. The wedge segments 166 have radially outwardly facing outer faces, which are in contact with the inner face of the plain bearing bush 114. The wedge segments 166 are each arranged approximately in the same axial plane as the toothing of the first sprocket 112.

Each of the two wedge segments 166 has two end faces that are largely perpendicular to the circumferential direction. As seen in the circumferential direction, the two wedge segments 166 are mirror-symmetric to one another. Each of the two wedge segments 166 has, as seen in a radial direction, a narrow end face and a wide end face. The wide end faces of the wedge segments 166 are preloaded away from one another by a spring 168, in the present case a spring 168 in the form of an annular spring.

The wedge segments 166 form, together with the shaft portion 132, an eccentric portion with an eccentricity e with respect to the axis of rotation A. The eccentric portion is a constituent of the first eccentric 160 and pushes the gear 130 and the first sprocket 112 into mesh with one another. By way of the spring 168, the two wedge segments 166 are preloaded away from one another such that, on account of a wedge effect, the gear 130 and the first sprocket 112 mesh in one another without backlash, such that the first eccentric 160 also provides radial backlash compensation between the first sprocket 112 and the gear 130.

The driver arm 164 engages with slight play between the wide end faces of the wedge segments 166, such that rotation of the driver 162, after a slight inoperative angle, causes the first eccentric 160 to rotate.

The hub 163 of the driver 162 has, in its center, a bore with a splined shaft profile, in which a complementary splined shaft profile of a transmission rod (not illustrated in the figures) meshes. The transmission rod is able to be driven manually or by an electric motor. A rotation of the transmission rod causes the first driver 162 and, as described in more detail below, a second driver 182 to rotate. In addition, the transmission rod can drive a second joint fitting of the vehicle seat synchronously with the joint fitting 100.

The second driver 182 is likewise mounted in a rotatable manner in the shaft portion 132. The second driver 182 has a hub 183, which is mounted in a rotatable manner with its outer shell in an end region, facing in the direction of the second fitting part 120, of the shaft portion 132. Connected to the hub 183 is a driver arm 184. Connected to the hub 183 is a driver arm 184 that engages regionally over the shaft portion 132 and is arranged at a radial distance from the hub 183. The driver arm 184 and the hub 183 transition into a covering disk 185, engaging radially over the first eccentric 180, of the driver 182.

Two wedge segments 186 of the second eccentric 180 are supported on the shaft portion 132 with their radially inwardly facing inner faces. The wedge segments 186 have radially outwardly facing outer faces, which are in contact with the inner face of the plain bearing bush 124 of the second fitting part 120. The wedge segments 186 are each arranged approximately in the same axial plane as the toothing of the second sprocket 122.

The wedge segments 186 are preloaded away from one another by a spring 188. The wedge segments 186 form, together with the shaft portion 132, an eccentric portion with an eccentricity e with respect to the axis of rotation A, which is oriented in the same direction as the eccentricity e of the first eccentric 160. The eccentric portion is a constituent of the second eccentric 180 and pushes the second sprocket 122 and the gear 130 into mesh with one another. By way of the spring 188, the two wedge segments 186 are preloaded away from one another such that, on account of a wedge effect, the second sprocket 122 and the gear 130 mesh in one another without backlash such that the second eccentric 180 also provides radial backlash compensation between the second sprocket 122 and the gear 130.

The driver arm 184 engages with slight play between the wide end faces of the wedge segments 186, such that a rotation of the second driver 182, after a slight inoperative angle, causes the eccentric 180 to rotate.

The hub 183 of the driver 182 has, in its center, a bore with a splined shaft profile, in which the complementary splined shaft profile of the transmission rod meshes. A rotation of the transmission rod therefore also causes the second driver 182 to rotate.

The two fitting parts 110; 120 are fixed axially with respect to one another by a clasp ring 190, wherein the two fitting parts 110; 120 are movable to a limited extent in a radial direction with respect to one another. The function of a clasp ring is known per se, for example from DE 10 2010 013 092 A1.

Figure 8:
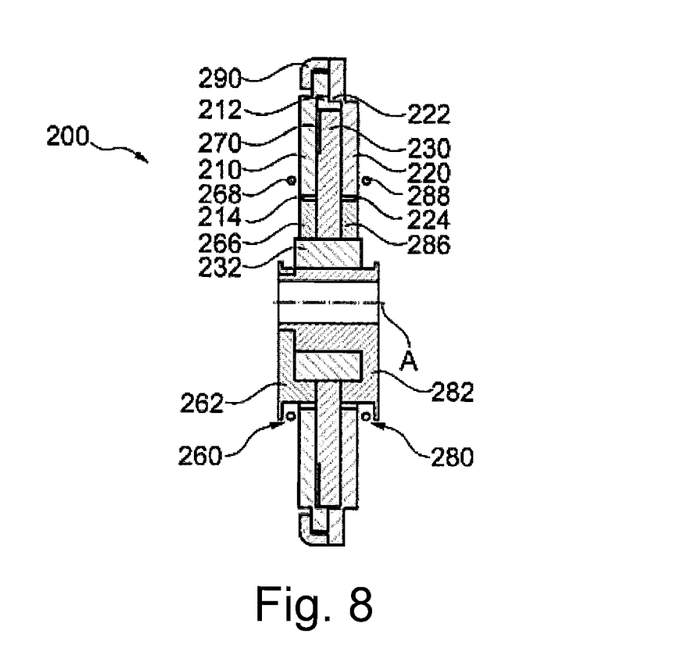

FIG. 8 shows a section through a joint fitting 200 according to a second exemplary embodiment, which corresponds in terms of structure and function to the above-described joint fitting 100 of the first exemplary embodiment, unless described otherwise below.

The joint fitting 200 has a first fitting part 210 and a second fitting part 220. The second fitting part 220 is rotatable about an axis of rotation A relative to the first fitting part 210.

The first fitting part 210 has a first sprocket 212. The axis of rotation A coincides with a central axis of the first sprocket 212. A plain bearing bush 214 has been pressed centrally into the first fitting part 210. The second fitting part 220 has a second sprocket 222. The axis of rotation A coincides with a central axis of the second sprocket 222. A plain bearing bush 224 has been pressed centrally into the second fitting part 220.

A gear 230 serves to drive the rotary movement of the second fitting part 220 about the axis of rotation A relative to the first fitting part 210. The gear 230 is in mesh with the first internally toothed sprocket 212 and the second internally toothed sprocket 222. The gear 230 can tumble within the internal sprockets 212; 222.

The gear 230 has a shaft portion 232, which protrudes axially on both sides beyond the toothing. The shaft portion 232 is central with respect to the toothing of the gear 230 and tumbles about the axis of rotation A in the driven state.

To drive the tumbling rolling movement of the gear 230 in the internal sprockets 212; 222 and therefore to drive the rotary movement of the second fitting part 220 about the axis of rotation A relative to the first fitting part 210, exactly one eccentric 260, also referred to below as first eccentric 260, is arranged between the shaft portion 232 and the plain bearing bush 214 of the first fitting part 210. In addition, exactly one further eccentric 280, also referred to below as second eccentric 280, is arranged between the shaft portion 232 and the plain bearing bush 224 of the second fitting part 220. The two eccentrics 260; 280 each have, in addition to the driving function, the function of radial backlash compensation, as described above.

A first driver 262 is mounted in a rotatable manner in the shaft portion 232. The first driver 262 has a hub 263, which is mounted in a rotatable manner in the shaft portion 232. A driver arm is connected to the hub 263.

Two wedge segments 266 are supported on the shaft portion 232 with their radially inwardly facing inner faces. The wedge segments 266 have radially outwardly facing outer faces, which are in contact with the inner face of the plain bearing bush 214. Each of the two wedge segments 266 has two end faces that are largely perpendicular to the circumferential direction. As seen in the circumferential direction, the two wedge segments 266 are mirror-symmetric to one another. The wedge segments 266 are preloaded away from one another by a spring 268.

The wedge segments 266 form, together with the shaft portion 232, an eccentric portion with an eccentricity e with respect to the axis of rotation A. The eccentric portion is a constituent of the first eccentric 260 and pushes the gear 230 and the first sprocket 212 into mesh with one another. By way of the spring 268, the two wedge segments 266 are preloaded away from one another such that, on account of a wedge effect, the gear 230 and the first sprocket 212 mesh in one another without backlash, such that the first eccentric 260 also provides radial backlash compensation between the first sprocket 212 and the gear 230.

In addition to the first eccentric 260, a disk 270 elastically preloaded in a radial direction provides radial backlash compensation between the first sprocket 212 and the gear 230. The disk 270 can exhibit a more resilient material radially on the inside than radially on the outside. A radially outer region of the disk 270 can be produced from a metal. A radially inner region of the disk 270 can be produced from a plastic.

The disk 270 has a toothing radially on the outside. The number of teeth of the toothing on the disk 270 is equal to the number of teeth of the first sprocket 212, with which the disk 270 is in mesh. The toothing of the disk 270 can be in mesh with the first sprocket 212. A radially inner region of the disk 270 is supported on an axial step of the gear 230. The toothing of the disk 270 protrudes radially slightly beyond the toothing of the gear 230. As a result, the toothing of the disk 270 is radially preloaded, with the result that the disk 270 provides radial backlash compensation between the first sprocket 212 and the gear 230.

The driver arm engages with slight play between the wide end faces of the wedge segments 266, such that a rotation of the driver 262, after a slight inoperative angle, causes the first eccentric 260 to rotate.

The hub 263 of the first driver 262 has, in its center, a bore with a splined shaft profile, in which a complementary splined shaft profile of a transmission rod (not illustrated in the figures) meshes. A rotation of the transmission rod causes the first driver 262 and, as described in more detail below, a second driver 282 to rotate.

The second driver 282 is likewise mounted in a rotatable manner in the shaft portion 232. The second driver 282 has a hub 283, which is mounted in a rotatable manner in the shaft portion 232. A driver arm is connected to the hub 283.

Two wedge segments 286 of the second eccentric 280 are supported on the shaft portion 232 with their radially inwardly facing inner faces. The wedge segments 286 have radially outwardly facing outer faces, which are in contact with the inner face of the plain bearing bush 224 of the second fitting part 220.

The wedge segments 286 are preloaded away from one another by a spring 288. The wedge segments 286 form, together with the shaft portion 232, an eccentric portion with an eccentricity e with respect to the axis of rotation A, which is oriented in the same direction as the eccentricity e of the first eccentric 260. The eccentric portion is a constituent of the second eccentric 280 and pushes the second sprocket 222 and the gear 230 into mesh with one another. By way of the spring 288, the two wedge segments 286 are preloaded away from one another such that, on account of a wedge effect, the second sprocket 222 and the gear 230 mesh in one another without backlash, such that the second eccentric 280 also provides radial backlash compensation between the second sprocket 222 and the gear 230.

The driver arm engages with slight play between the wide end faces of the wedge segments 286, such that a rotation of the second driver 282, after a slight inoperative angle, causes the second eccentric 280 to rotate.

The hub 283 of the driver 282 has, in its center, a bore with a splined shaft profile, in which the complementary splined shaft profile of the transmission rod meshes. A rotation of the transmission rod therefore also causes the second driver 282 to rotate.

The two fitting parts 210; 220 are fixed axially with respect to one another by a clasp ring 290, wherein the two fitting parts 210; 220 are movable to a limited extent in a radial direction with respect to one another.

The features disclosed in the above description, the claims and the figures can be of significance both on their own and in combination for implementing the invention in their various configurations, as long as they remain within the scope of protection of the claims.

Terms such as "comprise", "have", "contain", "include" and the like that are used in the claims do not exclude further elements or steps. The use of the indefinite article does not exclude a plurality. An individual device can carry out the functions of a plurality of units or devices mentioned in the claims.

LIST OF REFERENCE SIGNS

100 Joint fitting
110 First fitting part
112 First sprocket
114 Plain bearing bush
120 Second fitting part
122 Second sprocket
124 Plain bearing bush
126 Bush
130 Gear
132 Shaft portion
160 Eccentric
162 Driver
163 Hub
164 Driver arm
165 Covering disk
166 Wedge segment
168 Spring
180 Eccentric
182 Driver
183 Hub
184 Driver arm
185 Covering disk
186 Wedge segment
188 Spring
190 Clasp ring
200 Joint fitting
210 First fitting part
212 First sprocket
214 Plain bearing bush
220 Second fitting part
222 Second sprocket
224 Plain bearing bush
226 Bush
230 Gear
232 Shaft portion
260 Eccentric
262 Driver
263 Hub
266 Wedge segment
268 Spring
270 Disk
280 Eccentric
282 Driver
283 Hub
286 Wedge segment
288 Spring
290 Clasp ring
A Axis of rotation
e Eccentricity

What is claimed:

1. A joint fitting for a motor vehicle seat, comprising:
a first fitting part with a first sprocket,
a second fitting part with a second sprocket, the second fitting part being rotatable about an axis of rotation (A) relative to the first sprocket,
a gear, which rolls in the first sprocket and in the second sprocket, for generating a rotary movement between the first sprocket and the second sprocket,
a first eccentric, which is arranged between the first fitting part and the gear, for driving a rolling movement of the gear in the first sprocket, the first eccentric having two wedge segments and a spring that pushes the wedge segments apart, and a second eccentric, for eliminating backlash between the gear and the second sprocket, is arranged between the second fitting part and the gear, the second eccentric having two wedge segments,
wherein the gear has a shaft portion that protrudes from first and second sides of the gear,
wherein the wedge segments of the first eccentric are supported on the shaft portion on the first side of the gear,
wherein the wedge segments of the second eccentric are supported on the shaft portion on the second side of the gear,
wherein a first driver is mounted in a rotatable manner in a first side of the shaft portion and a second driver is mounted in a rotatable manner in a second side of the shaft portion,
wherein the first driver has a groove for receiving the shaft portion protruding from the first side of the gear and the second driver has a groove for receiving the shaft portion protruding from the second side of the gear.

2. The joint fitting as claimed in claim 1, wherein the two sprockets have a different number of teeth from one another, with the difference being one.

3. The joint fitting as claimed in claim 1, wherein the gear has a lower number of teeth than either of the two sprockets.

4. The joint fitting as claimed in claim 1, wherein the first and second eccentrics have an identically oriented eccentricity with respect to the axis of rotation.

5. The joint fitting as claimed in claim 4, wherein two wedge segments are arranged mirror-symmetrically to a plane of symmetry extending perpendicularly to the axis of rotation.

6. The joint fitting as claimed in claim 4, wherein the first and second eccentrics are arranged mirror-symmetrically to a plane of symmetry extending perpendicularly to the axis of rotation.

7. The joint fitting as claimed in claim 4, wherein the second eccentric has a spring that pushes its wedge segments apart and a driver that drives its wedge segments.

8. The joint fitting as claimed in claim 1, wherein the two wedge segments of the first eccentric are arranged circumferentially adjacent to one another and the two wedge segments of the second eccentric are arranged circumferentially adjacent to one another.

9. The joint fitting as claimed in claim 1, wherein the two fitting parts are fixed axially with respect to one another by a clasp ring, wherein the two fitting parts are movable to a limited extent in a radial direction with respect to one another.

10. The joint fitting as claimed in claim 1, wherein at least one of the first and second eccentrics is mounted in a plain bearing bush arranged in, including pressed into, one of the two fitting parts.

11. The joint fitting as claimed in claim 1, further comprising a disk, elastically preloaded in a radial direction, for eliminating backlash between the gear and one of the two sprockets.

12. A vehicle seat having at least one joint fitting as claimed in claim 1, wherein the seat has a sitting part and a backrest, which is articulated on the sitting part so as to be settable about the axis of rotation by the at least one joint fitting.

13. The joint fitting as claimed in claim 1, wherein a first arm attached to the first driver engages over the shaft portion.

14. The joint fitting as claimed in claim 13, wherein the first arm and a first hub transition to a first covering disk engaging over the first eccentric.

15. The joint fitting as claimed in claim 14, wherein the first hub is comprised of the first covering disk with an outer diameter and the first arm with an inner diameter smaller than the outer diameter and centered on the first covering disk.

16. The joint fitting as claimed in claim 1, wherein a second arm attached to the second driver engages over the shaft portion.

17. The joint fitting as claimed in claim 16, wherein the second arm and a second hub transition to a second covering disk engaging over the second eccentric.

18. The joint fitting as claimed in claim 17, wherein the first arm and the second arm are laterally adjacent to each other while the first covering disk and second covering disk are laterally distal from each other.

19. The join fitting as claimed in claim 17, wherein the second hub is comprised of the second covering disk with an outer diameter and the second arm with an inner diameter smaller than the outer diameter and centered on the second covering disk.

20. A joint fitting for a motor vehicle seat, comprising:
a gear, which rolls in a first sprocket and in a second sprocket, for generating a rotary movement between the first sprocket and the second sprocket,
wherein the gear has a shaft portion that protrudes from first and second sides of the gear,
wherein a first driver is mounted in a rotatable manner in a first side of the shaft portion and a second driver is mounted in a rotatable manner in a second side of the shaft portion,
wherein the first driver and the second driver are each comprised of a single piece.

* * * * *